United States Patent
Björnemo et al.

(10) Patent No.: US 11,105,947 B2
(45) Date of Patent: Aug. 31, 2021

(54) INVERSION OF ENHANCED-SENSITIVITY CONTROLLED SOURCE ELECTROMAGNETIC DATA

(71) Applicant: PGS Geophysical AS, Oslo (NO)

(72) Inventors: Lars Erik Magnus Björnemo, Houston, TX (US); Johan Mattsson, Houston, TX (US)

(73) Assignee: PGS Geophysical AS, Oslo (NO)

( * ) Notice: Subject to any disclaimer, the term of this patent is extended or adjusted under 35 U.S.C. 154(b) by 244 days.

(21) Appl. No.: 16/002,086

(22) Filed: Jun. 7, 2018

(65) Prior Publication Data

US 2018/0364388 A1 Dec. 20, 2018

Related U.S. Application Data

(60) Provisional application No. 62/519,480, filed on Jun. 14, 2017.

(51) Int. Cl.
*G01V 3/08* (2006.01)
*G01V 99/00* (2009.01)
*G01V 3/38* (2006.01)

(52) U.S. Cl.
CPC ............ *G01V 3/083* (2013.01); *G01V 3/38* (2013.01); *G01V 99/005* (2013.01); *G01V 2003/086* (2013.01)

(58) Field of Classification Search
CPC ........ G01V 3/083; G01V 3/38; G01V 99/005; G01V 2003/086
See application file for complete search history.

(56) References Cited

U.S. PATENT DOCUMENTS

| 4,107,597 A | * | 8/1978 | Meador ............... G01V 3/30 324/339 |
| 2006/0181451 A1 | * | 8/2006 | Samson, Jr. ......... G01S 13/449 342/160 |
| 2011/0264421 A1 | * | 10/2011 | Jing .................... G01V 3/38 703/2 |
| 2014/0012505 A1 | | 1/2014 | Smith |
| 2016/0003973 A1 | * | 1/2016 | Guner ................. G01V 99/00 702/11 |

OTHER PUBLICATIONS

Michael S. Zhdanov et al., "Rapid Imaging of Towed Streamer EM Data Using the Optimal Synthetic Aperture Method", IEEE Geoscience and Remote Sensing Letters, vol. 14, No. 2, Feb. 2017, pp. 262-266.*

(Continued)

*Primary Examiner* — Alexander Satanovsky (57) ABSTRACT

Inversion of enhanced-sensitivity controlled source electromagnetic data can include combining measured controlled source electromagnetic (CSEM) data onto a common set of virtual receiver positions for each of a plurality of positions of a source along a survey path, determining a steering vector that enhances a sensitivity of the measured CSEM data to a subsurface resistivity variation, and performing an inversion using the measured CSEM data and modeled CSEM data, each having the steering vector applied thereto as a data weight, to better identify the subsurface resistivity variation.

16 Claims, 5 Drawing Sheets

(56) References Cited

OTHER PUBLICATIONS

Daeung Yoon et al., "Optimal Synthetic Aperture Method for Marine Controlled-Source EM Surveys", IEEE Geoscience and Remote Sensing Letters, vol. 12, No. 2, Feb. 2015, pp. 414-418.*

Zhdanov, et al., "Rapid Imaging of Towed Streamer EM Data Using the Optimal Synthetic Aperture Method"; Acquired: (Jun. 20, 2016) (5 pgs).

Fan, et al., "Increasing the sensitivity of controlled-source electromagnetics with synthetic aperture"; Geophysics, vol. 77, No. 2 (Mar.-Apr. 2012) (pp. E135-E145) (19 figs) (11pgs).

Yoon, et al., "Optimal Synthetic Aperture Method for Marine Controlled-Source EM Surveys"; IEEE Geoscience and Remote Sensing Letters, vol. 12, No. 2 (Feb. 2015) (5 pgs).

MacGregor, et al., "Marine controlled-source electromagnetic methods in the hydrocarbon industry: A tutorial on method and practice"; Special Section: Interpretation and Integration of CSEM Data; vol. 2, No. 3 (Aug. 2014): p. SH13-SH32, Published Online May 20, 2014 http://www.rocksolidimages.com/pdf/Pub_2014_Int_Integration_CSEM.pdf.

* cited by examiner

INVERSION OF ENHANCED-SENSITIVITY CONTROLLED SOURCE ELECTROMAGNETIC DATA

CROSS-REFERENCE TO RELATED APPLICATIONS

This application claims priority to U.S. Provisional Application 62/519,480, filed Jun. 14, 2017, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources below the sea surface and over a subterranean formation to be surveyed for mineral deposits. Marine survey receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more marine survey sources, which can be seismic sources such as air guns or marine vibrator sources to produce signals at selected times. A marine survey source can be an electromagnetic source that injects current into the water. For seismic sources, each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The marine survey receivers thereby measure a wavefield that was initiated by the actuation of the marine seismic source. For electromagnetic sources, the electric current injected into the water travels into the subsurface according to diffusion physics that govern the Controlled Source ElectroMagnetic (CSEM) method. The resulting electromagnetic field in the water is measured by the receivers. The resulting electromagnetic field can be indicative of mineral deposits.

DETAILED DESCRIPTION

This disclosure is related generally to the field of marine surveying. Marine surveying can include, for example, seismic surveying or CSEM surveying, among others. For example, this disclosure may have applications in CSEM surveying. In CSEM surveying, one or more CSEM sources may be towed and are used to inject an electric current into a water volume. In at least one embodiment, electromagnetic (EM) receivers may be towed concurrently with the CSEM source. The EM receivers are electrode pairs that measure the potential difference between the electrodes within each pair thereby collecting marine CSEM data, which can vary and be dependent on the subsurface resistivity structure. CSEM can be inverted to generate images of the subsurface resistivity structure. High resistivity may be an indication of hydrocarbon if the structure shows a potential reservoir formation. In particular, the present disclosure is related to inversion of enhanced-sensitivity CSEM data. For example, the sensitivity of the CSEM data to resistive variations in the subsurface can be enhanced by combining measured CSEM data onto a common set of virtual receiver positions and determining a steering vector. The steering vector can be implemented in the inversion as an optimized, data dependent, weighting. Thus, the results of the inversion can be improved at a very small or even negligible computational cost. Some previous inversion methods for CSEM data are based on local search algorithms. Subsurface sensitivity improvements when inverting data at regions of interest can improve the success of CSEM surveys.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Figure 1:
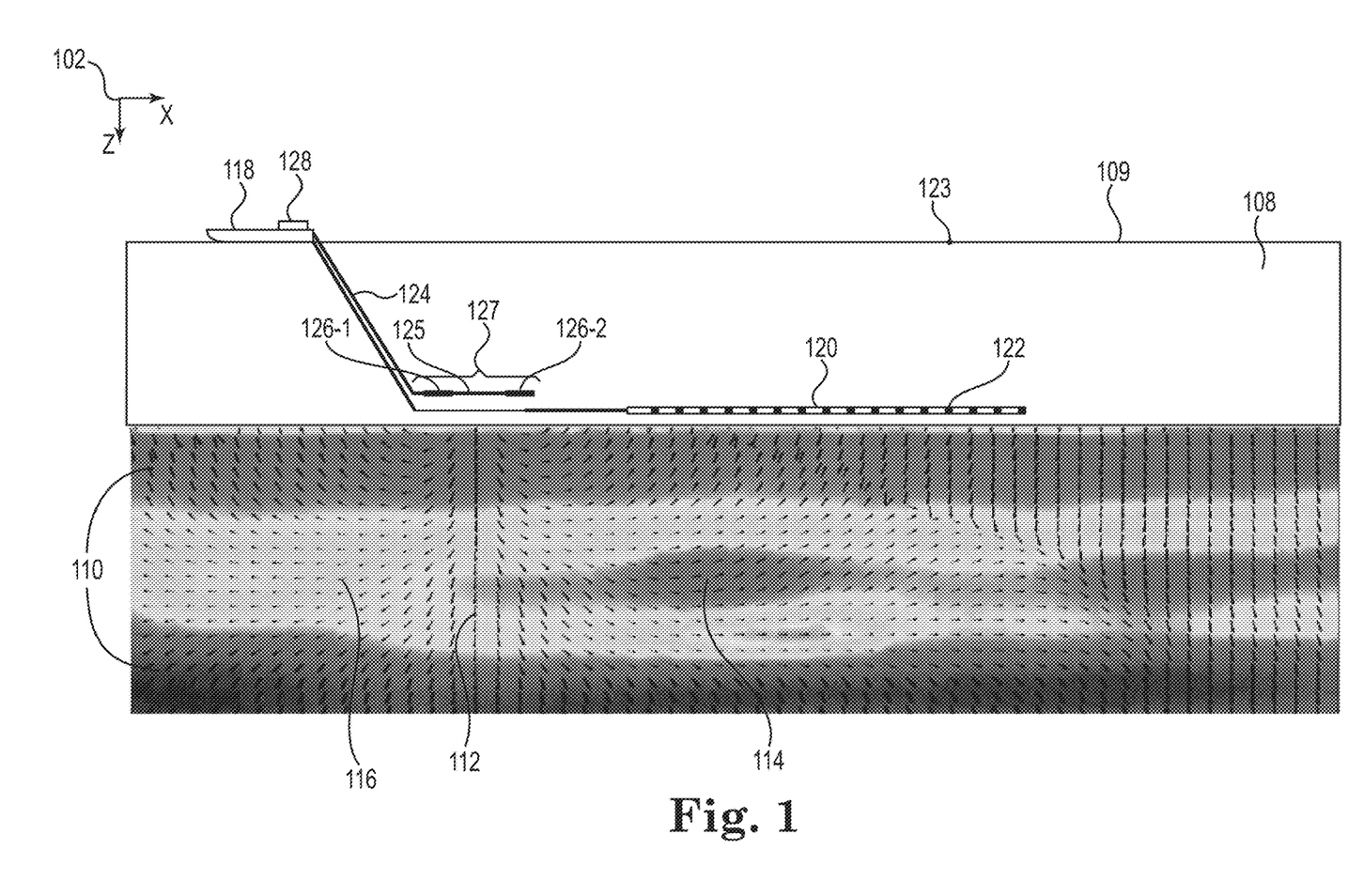
FIG. 1 illustrates an xz-plane view of controlled source electromagnetic (CSEM) surveying in which an electric current is injected into a water volume by a CSEM source.

FIG. 1 illustrates an xz-plane 102 view of CSEM surveying in which an electric current is injected into a water volume 108 by CSEM source 127. The CSEM source 127 can include a forward electrode 126-1 coupled to an aft electrode 126-2 via an interconnect cable 125. The forward electrode 126-1 can assume a relatively fixed layback (depth and distance) with respect to the marine survey vessel 118 and the aft electrode 126-2 can be maintained at a relatively fixed distance behind the forward electrode 126-1 because of drag forces from being towed. The forward electrode 126-1 can be coupled to the marine survey vessel 118 via a cable 124. The depth of the forward electrode 126-1 can be set by a deployed length of the cable 124. The interconnect cable 125 can cause changes in the depth or lateral position of the forward electrode 126-1 to be transmitted to the aft electrode 126-2. The CSEM source 127 can include one or more CSEM sources. For example, the forward electrode 126-1 and the aft electrode 126-2 can be a CSEM source, such as a dipole source. Because the forward electrode 126-1 and the aft electrode 126-2 can be maintained at a relatively fixed distance apart, the forward electrode 126-1 and the aft electrode 126-2 can be a horizontal dipole source.

FIG. 1 shows an example of a marine survey vessel 118 equipped to carry out CSEM surveys. Although not specifically illustrated, the marine survey vessel 118 can be configured to perform both CSEM surveys and marine seismic surveys. The marine survey vessel 118 can tow one or more streamers 120 (shown as one streamer for ease of illustration) below the water surface 109. The streamers 120 can be long cables containing power and data-transmission lines, such as electrical, optical fiber, etc., to which EM receivers 122 may be coupled. In a CSEM survey, the streamers 120 can make use of EM receivers 122, which detect changes in EM energy within the water volume 108. In marine seismic surveys, the streamers 120 can make use of seismic receivers that include a motion sensor, such as a geophone sensor, that detects particle displacement within the water volume 108 by detecting particle motion variation, such as velocities or accelerations, and a hydrophone that detects variations in pressure. In another type of marine survey, such as three-dimensional (3D) seismic EM surveys, receivers on one or more streamers 120 can include EM receivers and seismic receivers such that the streamers 120 can be used to detect both changes in EM energy and seismic energy.

Although not illustrated in FIG. 1, the marine survey vessel 118 can tow marine seismic survey equipment concurrently with the CSEM source 127. The marine seismic survey equipment can include, but is not limited to, seismic sources and streamers, such as the streamer 120. A seismic source can emit an expanding, spherical acoustic signal, which can be analogized to semicircles of increasing radius centered at the seismic source, representing a down-going wavefield, following an acoustic signal emitted by the seismic source. The outward and downward expanding down-going wavefield may eventually reach a solid surface, such as the seafloor, at which point the outward and downward expanding down-going wavefield may partially scatter, may partially reflect back toward the streamer, and may partially refract downward into a solid volume, such as the subsurface, becoming elastic acoustic signals within the solid volume. In contrast, an EM signal is diffusive in nature. The EM field is described by the diffusion limit of Maxwell's equations.

CSEM sources 127 and/or streamers 120 may also be towed by other vessels, or may be otherwise disposed in water volume 108. For example, EM receivers may be located on ocean bottom cables or nodes fixed at or near the water bottom, and CSEM sources 127 may also be disposed in a nearly-fixed or fixed configuration. For the sake of efficiency, illustrations and descriptions herein show EM receivers 122 located on streamers 120, but it should be understood that references to EM receivers located on a "streamer" or "cable" should be read to refer equally to marine survey receivers located on a towed streamer, an ocean bottom receiver cable, and/or an array of nodes.

The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the EM receivers 122 along the streamer 120 are shown to lie below the sea surface 109, with the receiver positions correlated with overlying surface positions, such as a position 123 near the water surface 109 correlated with the position of receiver 122. Although not specifically illustrated, for some surveys, the streamers 120 can be towed by one vessel, such as the marine survey vessel 118, and the CSEM source 127 can be towed by a different vessel.

A controller 128 can be onboard the marine survey vessel 118. The controller 128 can be coupled to the CSEM source 127. The controller 128 can include processing resources and memory resources and be configured to operate the CSEM source 127. The controller 128 can be coupled to the streamer 120. The controller 128 can be configured to receive data from the EM receivers 122 associated with the streamer 120. In at least one embodiment, the controller 128 can be configured to perform an inversion of enhanced-sensitivity CSEM data as described in more detail herein. For example, processing and analysis of CSEM data from injecting the electric current can be performed in order to help characterize the resistivity structures and distributions of features and materials underlying the surface of the earth. Geological models, such as subsurface resistivity models, can be used to model the EM fields resulting from the current injected from the CSEM source 127 above the subsurface that does or does not contain hydrocarbons. By comparing CSEM data from a CSEM survey using the CSEM source 127 to the geological models, a likelihood of hydrocarbons being located in the surveyed subsurface can be determined.

The CSEM source 127 can be used with various frequencies (for example, from 0.1 hertz (Hz) to 100 Hz) of switched DC power. Low frequencies can promote penetration of an EM field resulting from the electric current into the water volume 108; however, the resolution of the CSEM data may be low. In contrast, high frequencies can yield high resolution CSEM data but the EM field may not penetrate the subsurface as much as the low frequencies. It is beneficial to use a wide frequency band to get a combination of deep penetration into the subsurface and good resolution of the CSEM data.

FIG. 1 shows energy flux 112 and 116 (displayed as arrows) resulting from the electric current injected by the CSEM source 127 and a subsurface resistivity profile 110 from an inversion (indicated by the shading). A change in the resistivity profile may indicate a change in the geology of the subsurface. For example, the darker shading 114 surrounded by lighter shading may be indicative of hydrocarbons in the subsurface. Inversion means reversing a known physical relation in order to infer physical properties from measured data. For example, an inversion compares modeled data to measured data and iteratively minimizes the difference there between. In the case of CSEM surveys, it is the subsurface resistivities that are inverted for using CSEM data received at different positions and offsets from the CSEM source 127. The subsurface resistivity cannot be directly measured using this technique, which is why an inversion is used. To accurately identify variations in the subsurface resistivity (possibly indicating a hydrocarbon saturated volume), a signal-to-noise ratio of an EM response in the CSEM data must be sufficient to facilitate detection of the EM response. In at least one embodiment, the received or measured CSEM data has a signal-to-noise ratio such that inversion thereof without the optimized steering vector being applied thereto does not identify the subsurface resistivity variation within an identification threshold. For example, the identification threshold can be a particular uncertainty in the frequency response data (the measured data after processing), such as three percent, five percent, or another uncertainty defined for a particular survey.

In order to enhance the sensitivity of the CSEM data, at least one embodiment of the present disclosure can normalize and interpolate measured CSEM data onto a common set of virtual receiver positions for all source positions along a survey path and optimize a steering vector to maximize the response from the subsurface variations. The CSEM data can be divided into spatial actuations along a survey path and then combined to the virtual receiver positions.

Figure 2:
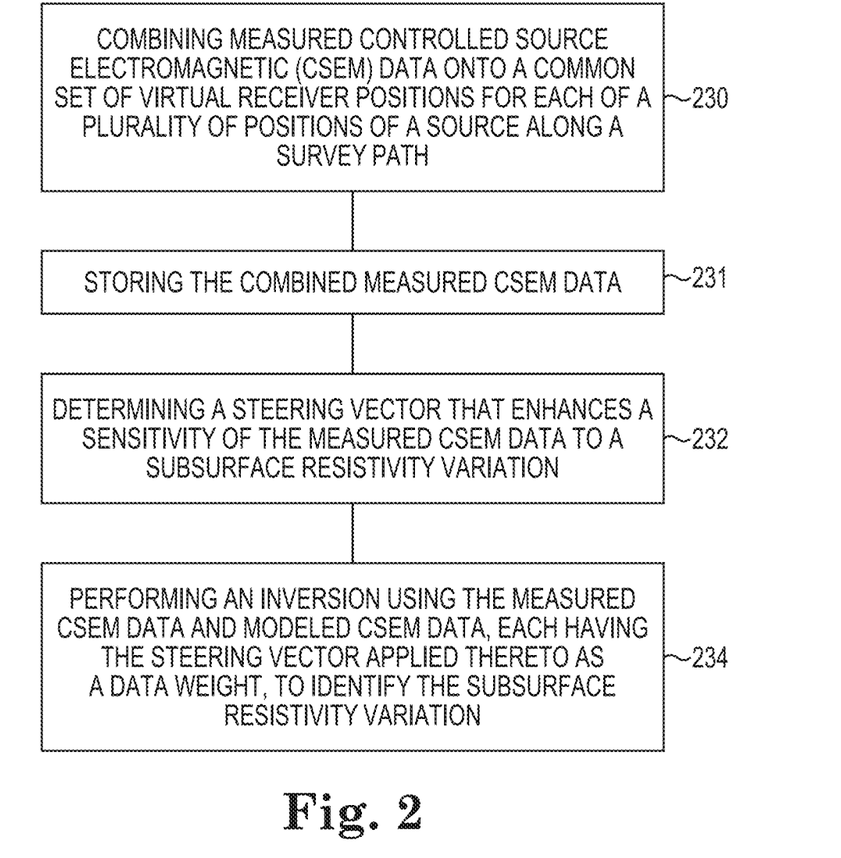
FIG. 2 illustrates a method flow diagram for inversion of enhanced-sensitivity controlled source electromagnetic data.

FIG. 2 illustrates a method flow diagram for inversion of enhanced-sensitivity controlled source electromagnetic data. At block 230, the method can include combining measured CSEM data onto a common set of virtual receiver positions for each of a plurality of positions of a source along a survey path. A virtual receiver is a representation of an actual receiver in a position where an actual receiver may not exist. Initially, the CSEM data can be linearly combined with arbitrary data weights. This can be expressed as a matrix using vector multiplication as:

$$d_{SA} = D^N w \quad (1)$$

where $d_{SA}$ is a data vector, $D^N$ is a matrix including the measured CSEM data, and w is the steering vector. In at least one embodiment, the steering vector can comprise complex-valued weights. Combining the measured CSEM data can include interpolating and normalizing the measured CSEM data onto the common set of virtual receiver positions. The measured CSEM data can be interpolated between actual receiver positions to the common set of virtual receiver positions. The measured CSEM data can be normalized by a reference amplitude from modeled CSEM data. For example, the reference amplitude can be an amplitude associated with an actual receiver located among (e.g., in a middle of) a plurality of actual receivers (such as the EM receivers 122 illustrated in FIG. 1). The normalization can result in amplified changes in subsurface resistivity in the measured CSEM data.

At block 231, the method can include storing the combined measured CSEM data. The combined measured CSEM data can be stored on a non-transitory machine readable medium.

At block 232, the method can include determining a steering vector that enhances a sensitivity of the measured CSEM data to a subsurface resistivity variation. The determined steering vector can include non-arbitrary weights and can be used to enhance the sensitivity of the CSEM data to the subsurface resistivity variation. Determining the steering vector can include minimizing a functional:

$$P_{SA}(w) = \|C - A(w)\| + \beta \|w - w_{ap}\| \quad (2)$$

where:

$$A(w) = D^N w \cdot / D^{bN} w \quad (3)$$

that defines the steering vector in terms of a target response C, a combined response relative to a background response $D^{bN}$, a regularization parameter $\beta$, and an a priori steering vector $w_{ap}$. $P_{SA}(w)$ is the value of the objective functional that is to be minimized in order to maximize a difference from a background response. A(w) is a vector that describes the relation between linearly combined data and background data. $\|C-A(w)\|$ is the norm of the difference between a reference level and the target response. The background response can be the background response of the modeled CSEM data or the measured CSEM data. The background response can be modeled CSEM data at a location where the subsurface resistivity is considered as background. For example, the subsurface resistivity that is considered as background can be the subsurface resistivity that is indicative of the subsurface in general, such as where there are no hydrocarbons. The background response can be measured CSEM data at a location other than the location of the subsurface resistivity variation. In Equation 3, applying (e.g., multiplying) the steering vector w to the matrix including the measured CSEM data $D^N$ and the matrix including the background response $D^{bN}$ creates a respective vector for each matrix. Also in Equation 3, "./" indicates element-by-element division (the first element of a first vector divided by a first element of a second vector, etc.). Minimizing the functional can increase a deviation of the subsurface resistivity variation from the background response.

At block 234, the method can include performing an inversion using the measured CSEM data and modeled CSEM data, each having the steering vector applied thereto as a data weight, to identify the subsurface resistivity variation. A respective steering vector w can be optimized for each of a plurality of survey paths (K survey paths). The optimized steering vectors can form a weight matrix:

$$W_{SA} = \begin{bmatrix} w_1^T & 0 & \cdots & 0 \\ 0 & w_2^T & \ddots & \vdots \\ \vdots & \ddots & \ddots & 0 \\ 0 & \cdots & 0 & w_K^T \end{bmatrix}$$

where "T" indicates a transpose of a vector for a particular survey path from 1-K (a column being transposed into a row). The weight matrix $W_{SA}$ can be applied to vectors including the modeled and measured CSEM data (from a plurality of survey paths) respectively. The inversion's objective functional becomes:

$$P_{inv}(m) = \|W_d(W_{SA}E(m) - W_{SA}d)\|_{L_2}^2 + \alpha R(m) \quad (4)$$

$$= \|W_d W_{SA}(E(m) - d)\|_{L_2}^2 + \alpha R(m) \quad (5)$$

where d is the measured electric field, $W_d$ is a manual vector based on uncertainty that seeks to normalize amplitude to allow small changes to be amplified and to help avoid artefacts, E(m) is the modeled electric field as a function of the subsurface resistivity model m, $\alpha R(m)$ is a regularization term where $\alpha$ is a weight, R is a function of the model itself, and m is a vector containing resistivity of many (e.g., millions) cells into which the subsurface is discretized. For example, the cell size can be 250 meters wide×250 meters long×10 meters deep. The regularization term $\alpha R(m)$ is used to make the corresponding linear system of equations for the model update at each inversion iteration non-singular.

The weight matrix $W_{SA}$ can act as an optimized data weight matrix. The weight matrix $W_{SA}$ depends on the data d, so even if the application of the weights is a linear operation, the full inversion process is non-linear. With the use of the optimized steering vector or weight matrix, the inversion can better identify the resistive variation and provide a more accurate result. The optimization of the steering vector is fast in relation to a typical 3D CSEM inversion, so there is no practical slowdown or any significant computational cost added. At least one embodiment of the present disclosure can cause a computer performing an inversion of CSEM data to do so more efficiently.

In at least one embodiment, the method described with respect to FIG. 2 includes a process for identifying a subsurface resistivity variation by performing an inversion of measured and modeled CSEM data, wherein the method is a specific improvement consisting of one or more of elements 230, 232, and 234 of the method. In at least one embodiment, the specific improvement can include combining measured CSEM data onto a common set of virtual receiver positions for each of a plurality of positions of a source along a survey path and determining a steering vector that enhances a sensitivity of the measured CSEM data to a subsurface resistivity variation, allowing the results of the inversion to be improved.

Figure 3A:
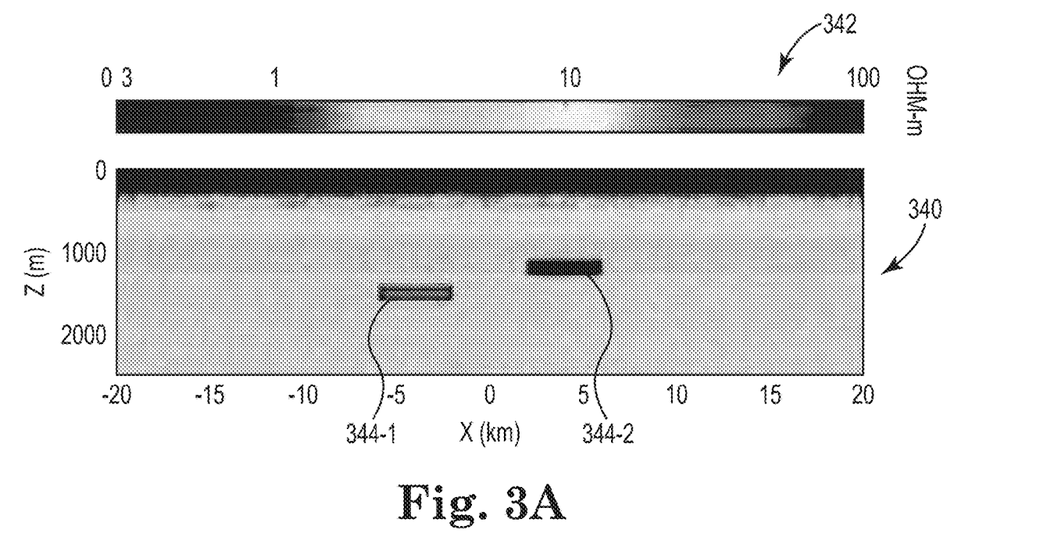
FIG. 3A illustrates a resistivity model of a subsurface.

FIG. 3A illustrates a resistivity model 340 of a subsurface. The resistivity model 340 includes a scale 342 of the resistivities displayed, where the left side of the scale indicates relatively lesser resistivity and the right side of the scale indicates relatively greater resistivity. For example, the scale can represent resistivities in Ohm-meters. The vertical axis of the resistivity model 340 indicates depth in the z-direction, which can be indicated in meters and the horizontal axis indicates a horizontal distance, which can be indicated in kilometers. For example, corresponding received CSEM data can be measured every 300 meters over the 40 kilometers indicated along the horizontal axis. The top of the resistivity model 340 includes a region that indicates a relatively low resistivity associated with the water layer. In the subsurface, the resistivity model 340 includes a first resistive variation 344-1 and a second resistive variation 344-2 relative to the background resistivity of the subsurface in the resistivity model 340. The background resistivity of the subsurface resistivity model 340 may be regarded as modeled CSEM data. The first resistive variation 344-1 and the second resistive variation 344-2 may be regarded as measured CSEM data.

Figure 3B:
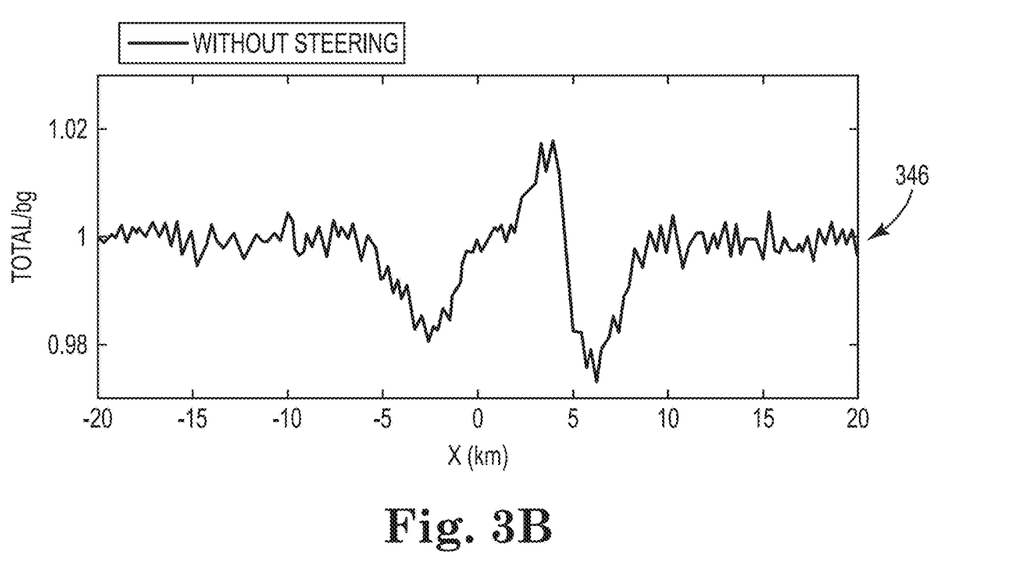
FIG. 3B illustrates a graph 346 of the difference between the modeled controlled source electromagnetic data and measured controlled source electromagnetic data depicted in FIG. 3A without the use of an optimized steering vector.

FIG. 3B illustrates a graph 346 of the difference between the modeled controlled source electromagnetic data and measured controlled source electromagnetic data depicted in FIG. 3A without the use of an optimized steering vector. The graph 346 can represent the results of Equation 3 before the optimization is carried out. For example, it can represent the results of Equation 3 with a weight w=1. The vertical axis of the graph 346 represents a unitless measure of the difference between the modeled and measured CSEM data (total/background). The horizontal axis is the same as the horizontal axis in FIG. 3A. The value of the graph 346 along the vertical axis ranges only from about 0.98 to about 1.02 in relative magnitude, which indicates that only a 2% response is provided. The jagged nature of the data displayed indicates that the signal-to-noise ratio is quite low because so much noise is evident. It is difficult to identify the resistive variations based on the graph 346.

Figure 3C:
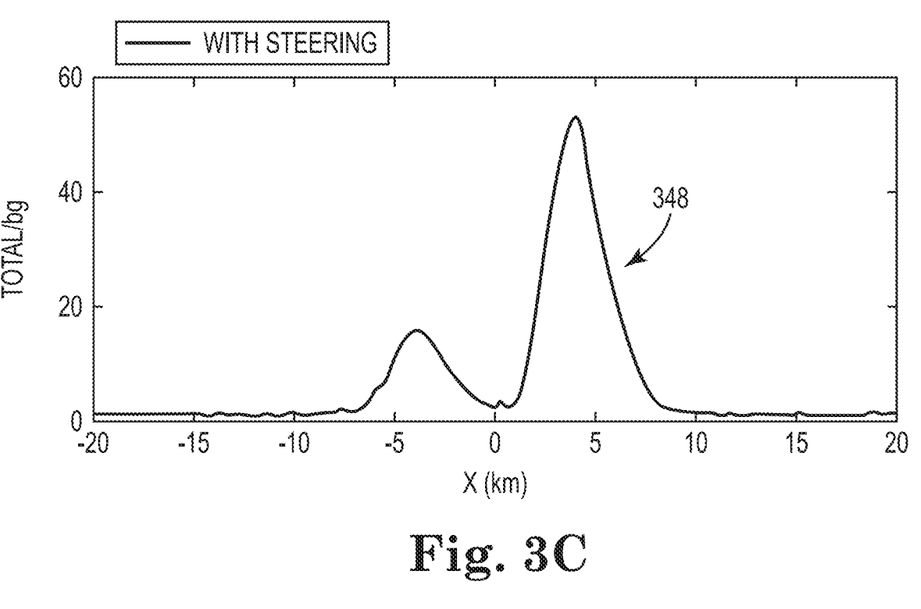
FIG. 3C illustrates a graph 348 of the difference between the modeled controlled source electromagnetic data and measured controlled source electromagnetic data depicted in FIG. 3A with the use of an optimized steering vector according to at least one embodiment of the present disclosure.

FIG. 3C illustrates a graph 348 of the difference between the modeled controlled source electromagnetic data and measured controlled source electromagnetic data depicted in FIG. 3A with the use of an optimized steering vector according to at least one embodiment of the present disclosure. The graph 348 can represent the results of Equation 3 after the optimization is carried out. Comparing FIG. 3C to FIG. 3B illustrates the lift-up in signal-to-noise ratio that is achieved by the optimization of the steering vector. The vertical axis of the graph 348 represents a unitless measure of the difference between the modeled and measured CSEM data (total/background). The horizontal axis is the same as the horizontal axis in FIG. 3A. The value of the graph 348 along the vertical axis corresponding to the first resistive variation 344-1 ranges from about 1 to about 20 in relative magnitude, which indicates that a 2000% response is provided. The value of the graph 348 along the vertical axis corresponding to the second resistive variation 344-2 ranges from about 1 to about 50 in relative magnitude, which indicates that a 5000% response is provided. The percent response combined with the smooth nature of the data displayed indicates that the signal-to-noise ratio is sufficient to identify the resistive variations.

Figure 4:
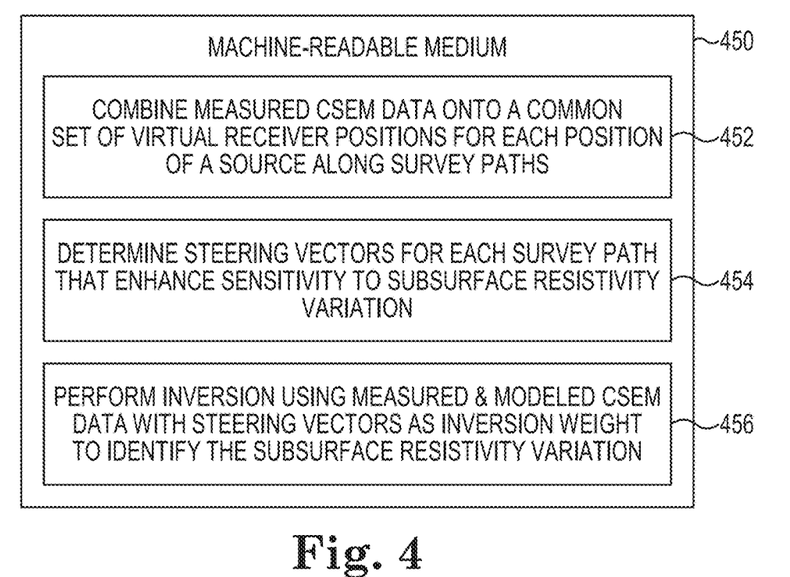
FIG. 4 illustrates a diagram of a machine-readable medium for inversion of enhanced-sensitivity controlled source electromagnetic data.

FIG. 4 illustrates a diagram of a machine-readable medium 450 for inversion of enhanced-sensitivity controlled source electromagnetic data. The machine readable medium 450 can be non-transitory. The machine readable medium 450 can, in at least one embodiment, be analogous to the memory resource 562 illustrated in FIG. 5. The machine readable medium 450 can store instructions executable by a processing resource. For example, at 452, the machine readable medium 450 can store instructions executable to combine measured CSEM data onto a respective common set of virtual receiver positions for each of a plurality of positions of a source along a plurality of survey paths. At 454, the machine readable medium 450 can store instructions executable to determine a respective steering vector for each of the plurality of survey paths that enhances a sensitivity of the measured CSEM data to a subsurface resistivity variation. At 456, the machine readable medium 450 can store instructions executable to perform an inversion using the measured CSEM data and modeled CSEM data, each having a matrix including the respective steering vectors applied thereto as a data weight, to identify the subsurface resistivity variation.

Although not specifically illustrated, the machine readable medium 450 can store instructions executable to generate an image based on a result of the inversion, wherein the image illustrates the subsurface resistivity variation. Such an image can be useful to prospectors seeking to extract hydrocarbons that may be associated with the subsurface resistivity variation. The machine readable medium 450 can store instructions executable to transpose each of the respective steering vectors and to form the matrix as a sparse matrix including the transposed steering vectors. For example, each of the respective steering vectors can be determined independently for each of the plurality of survey paths. Each survey path can be one pass or line over a given area by a marine survey vessel. In some surveys, the marine survey vessel may pass over a given survey area more than one time, meaning that receivers associated with the marine survey vessel can receive signals from the given survey area on each pass over the survey area. This does not necessarily mean that the marine survey vessel itself passes directly over the survey area. The instructions to form the sparse matrix including the transposed steering vectors can allow the steering vectors to be applied as a weight matrix to the measured CSEM data and modeled CSEM data (electric fields).

Figure 5:
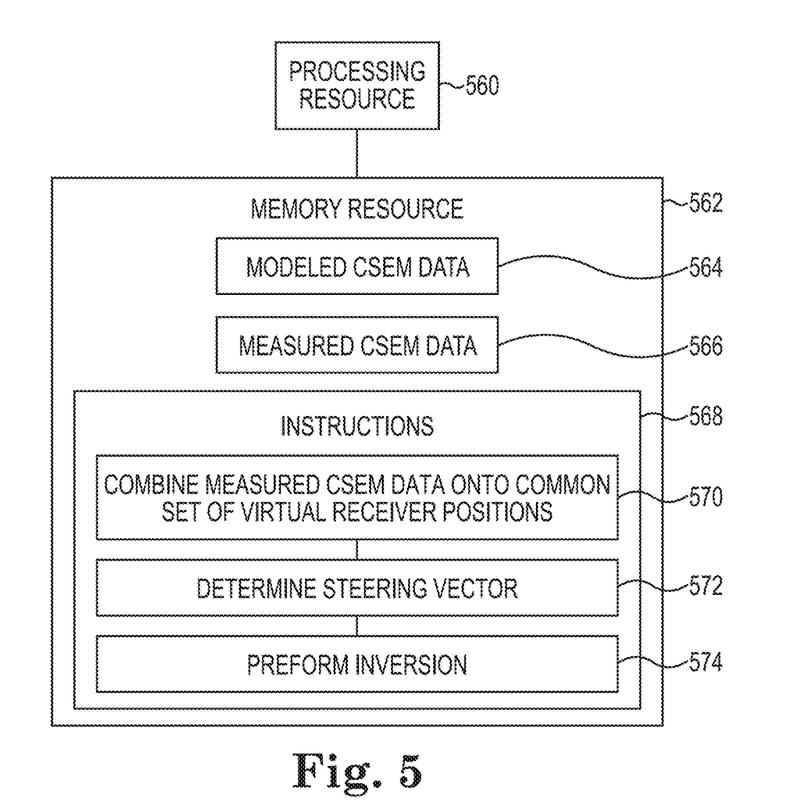
FIG. 5 illustrates a diagram of a system for inversion of enhanced-sensitivity controlled source electromagnetic data.

FIG. 5 illustrates a diagram of a system for inversion of enhanced-sensitivity controlled source electromagnetic data. In at least one embodiment, the system can be analogous to or implemented by the controller 128 illustrated in FIG. 1. The system can utilize software, hardware, firmware, and/or logic to perform a number of functions. The system can be a combination of hardware and executable instructions configured to perform a number of functions (e.g., actions). The hardware, for example, can include a processing resource 560, such as at least one processor, and a memory resource 562, such as a machine-readable medium or other non-transitory memory resource 562. The memory resource 562 can be internal and/or external to the system. For example, the system can include an internal memory resource and have access to an external memory resource. The executable instructions 562 can be stored on the machine-readable medium as machine-readable and executable and to implement a particular function. For example, the executable instructions 568 can be executed by the processing resource 560. The memory resource 562 can be coupled to the system in a wired and/or wireless manner. For example, the memory resource 562 can be an internal memory, a portable memory, a portable disk, and/or a memory associated with another resource, for example, enabling the executable instructions 562 to be transferred and/or executed across a network such as the Internet. In at least one embodiment, the memory resource 562 can be a plurality of non-transitory machine readable media.

The memory resource 562 can be non-transitory and can include volatile and/or non-volatile memory. Volatile memory can include memory that depends upon power to store information, such as various types of dynamic random access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid state drive, etc., as well as other types of non-transitory machine-readable media.

The processing resource 560 can be coupled to the memory resource 562 via a communication path. The communication path can be local or remote to system. Examples of a local communication path can include an electronic bus internal to a machine, where the memory resource 562 is in communication with the processing resource 560 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resource 562 is remote from the processing resource 560, such as in a network connection between the memory resource 562 and the processing resource 560. That is, the communication path can be a network connection. Examples of such a network connection can include a local area network, wide area network, personal area network, and the Internet, among others.

The memory resource 562 can store modeled CSEM data 564 and measured CSEM data 566. The modeled CSEM data 564 can be obtained from modeling or from a third party that conducted the modeling. The measured CSEM data 566 can be obtained from a marine survey or from a third party that conducted the marine survey. The executable instructions 568 stored in the memory resource 562 can be segmented into a number of modules 570, 572, and 574 that when executed by the processing resource 560 can perform a number of functions. As used herein a module includes a set of instructions included to perform a particular task or action. The number of modules 570, 572, and 574 can be sub-modules of other modules. For example, the module 570 can be a sub-module of the module 572 and/or the module 570 and the module 572 can be contained within a single module. Furthermore, the number of modules 570, 572, and 574 can comprise individual modules separate and distinct from one another. Examples are not limited to the specific modules 570, 572, and 574 illustrated in FIG. 5.

Module 570 can instructions executable by the processing resource 560 to combine the measured CSEM data onto a common set of virtual receiver positions for each of a plurality of positions of a source along a survey path. Module 572 can include instructions executable by the processing resource 560 to determine a steering vector that enhances a sensitivity of the measured CSEM data to a subsurface resistivity variation. Module 574 can include instructions executable by the processing resource 560 to perform an inversion using the measured CSEM data and the modeled CSEM data, each having the steering vector applied thereto as a data weight, to identify the subsurface resistivity variation.

Although not specifically illustrated, the executable instructions 568 can include instructions to determine the steering vector in response to a difference between the modeled CSEM data and measured CSEM data having a signal-to-noise ratio such that inversion thereof without the optimized steering vector being applied thereto does not identify the subsurface resistivity variation within an identification threshold. Such embodiments can be useful for enhancing the sensitivity of the measured CSEM data to a subsurface resistivity variation when other methods are not able to provide a signal-to-noise ratio sufficient to facilitate detection of the EM response.

Although not specifically illustrated as such, the instructions 568 can be implemented by a number of engines that can be in communication with the memory resource 562 and the data stored therein (e.g., via a communication link). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, etc. The number of engines can include a combination of hardware and program instructions that is configured to perform a number of functions described herein. The program instructions, such as software, firmware, etc., can be stored in a memory resource such as a machine-readable medium or as a hard-wired program such as logic. Hard-wired program instructions can be considered as both program instructions and hardware.

In accordance with a number of embodiments of the present disclosure, a geophysical data product may be manufactured by a method including combining measured CSEM data onto a common set of virtual receiver positions for each of a plurality of positions of a source along a survey path, determining a steering vector that enhances a sensitivity of the measured CSEM data to a subsurface resistivity variation, performing an inversion using the measured CSEM data and modeled CSEM data, each having the steering vector applied thereto as a data weight, to identify the subsurface resistivity variation, and recording a result of the inversion on a non-transitory machine-readable medium. The geophysical data product may be produced by performing the inversion offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    receiving controlled source electromagnetic (CSEM) data, measured via electromagnetic receivers, based on operation of a source towed along a survey path above a subsurface that includes a subsurface resistivity variation;
    receiving modeled CSEM data comprising a modeled electric field resulting from operation of the source above the subsurface as a function of a subsurface resistivity model;
    wherein the measured CSEM data has a signal-to-noise ratio such that inversion of the measured CSEM data and the modeled CSEM data does not identify the subsurface resistivity variation within an identification threshold;
    combining the measured CSEM data onto a common set of virtual receiver positions for each of a plurality of positions of the source along the survey path;
    storing the combined measured CSEM data;
    determining a steering vector that enhances a sensitivity of the measured CSEM data to a subsurface resistivity variation from a background subsurface resistivity;
    performing an inversion using the measured CSEM data and the modeled CSEM data to identify the subsurface resistivity variation within the identification threshold, wherein performing the inversion includes applying the steering vector as a data weight to the measured CSEM data and the modeled CSEM data; and
    generating an image with enhanced sensitivity to the subsurface resistivity variation based on a result of the inversion with the steering vector being applied thereto, wherein the image illustrates the subsurface resistivity variation.

2. The method of claim 1, wherein determining the steering vector comprises minimizing a functional that defines the steering vector in terms of a target response, a combined response relative to the background subsurface resistivity, a regularization parameter, and an a priori steering vector.

3. The method of claim 2, wherein minimizing the functional comprises increasing a deviation of the subsurface resistivity variation from the background subsurface resistivity.

4. The method of claim 3, wherein the background subsurface resistivity comprises modeled CSEM data at a location where subsurface resistivity is considered as background.

5. The method of claim 3, wherein the background subsurface resistivity comprises measured CSEM data at a location other than a location of the subsurface resistivity variation.

6. The method of claim 3, further comprising applying the steering vector, comprising complex-valued weights, to a matrix including the measured CSEM data.

7. The method of claim 1, wherein combining the measured CSEM data comprises interpolating and normalizing the measured CSEM data onto the common set of virtual receiver positions.

8. The method of claim 7, wherein interpolating the measured CSEM data comprises interpolating the measured CSEM data between actual receiver positions to the common set of virtual receiver positions.

9. The method of claim 8, wherein normalizing the measured CSEM data comprises normalizing the measured CSEM data by a reference amplitude from the modeled CSEM data.

10. The method of claim 8, wherein normalizing the measured CSEM data comprises normalizing the measured CSEM data by a reference amplitude comprising an amplitude associated with an actual receiver located among a plurality of actual receivers.

11. The method of claim 8, wherein normalizing the measured CSEM data comprises normalizing the measured CSEM data by a reference amplitude comprising an amplitude associated with an actual receiver located in a middle of a plurality of actual receivers.

12. The method of claim 8, wherein normalizing the measured CSEM data includes amplifying changes in subsurface resistivity in the measured CSEM data.

13. The method of claim 1, further comprising receiving the measured CSEM data, wherein a signal-to-noise ratio of the measured CSEM data is such that inversion thereof without the steering vector applied thereto does not identify the subsurface resistivity variation within the identification threshold.

14. A system, comprising:
    a processing resource; and
    a memory resource coupled to the processing resource, wherein the memory resource stores:
        measured, via electromagnetic receivers, controlled source electromagnetic (CSEM) data based on operation of a towed source along a survey path above a subsurface that includes a subsurface resistivity variation;

modeled CSEM data comprising a modeled electric field resulting from operation of the source above the subsurface as a function of a subsurface resistivity model, wherein the measured CSEM data has a signal-to-noise ratio such that inversion of the measured CSEM data and the modeled CSEM data does not identify the subsurface resistivity variation within an identification threshold; and instructions executable by the processing resource to:
  combine the measured CSEM data onto a common set of virtual receiver positions for each of a plurality of positions of a source along the survey path;
  determine a steering vector that enhances a sensitivity of the measured CSEM data to a subsurface resistivity variation from a background subsurface resistivity;
  perform an inversion using the measured CSEM data and the modeled CSEM data to identify the subsurface resistivity variation within the identification threshold, wherein the instructions to perform the inversion include instructions to apply the steering vector as a data weight to the measured CSEM data and the modeled CSEM data; and
  generate an image with enhanced sensitivity to the subsurface resistivity variation based on a result of the inversion with the steering vector being applied thereto, wherein the image illustrates the subsurface resistivity variation.

15. The system of claim 14, wherein the instructions are executable to determine the steering vector in response to a difference between the modeled CSEM data and measured CSEM data having a signal-to-noise ratio such that inversion thereof without the steering vector being applied thereto does not identify the subsurface resistivity variation within the identification threshold.

16. The system of claim 14, wherein the memory resource comprises a plurality of non-transitory machine readable media; and
  wherein the processing resource comprises at least one processor.

* * * * *